(12) United States Patent
Conikee et al.

(10) Patent No.: US 11,074,362 B2
(45) Date of Patent: Jul. 27, 2021

(54) SYSTEM AND METHOD FOR CODE-BASED PROTECTION OF SENSITIVE DATA

(71) Applicant: ShiftLeft Inc, Santa Clara, CA (US)

(72) Inventors: Chetan Conikee, Santa Clara, CA (US); Markus Lottmann, Berlin (DE); Fabian Yamaguchi, Berlin (DE); Vlad A Ionescu, Menlo Park, CA (US)

(73) Assignee: ShiftLeft, Inc., Santa Clara, CA (US)

( * ) Notice: Subject to any disclaimer, the term of this patent is extended or adjusted under 35 U.S.C. 154(b) by 288 days.

(21) Appl. No.: 16/209,419

(22) Filed: Dec. 4, 2018

(65) Prior Publication Data

US 2019/0171846 A1 Jun. 6, 2019

Related U.S. Application Data

(60) Provisional application No. 62/594,368, filed on Dec. 4, 2017.

(51) Int. Cl.
| | |
|---|---|
| *G06F 21/62* | (2013.01) |
| *G06F 21/52* | (2013.01) |
| *G06F 21/57* | (2013.01) |
| *G06F 40/216* | (2020.01) |
| *G06F 40/30* | (2020.01) |

(52) U.S. Cl.
CPC .......... *G06F 21/6245* (2013.01); *G06F 21/52* (2013.01); *G06F 21/577* (2013.01); *G06F 40/216* (2020.01); *G06F 40/30* (2020.01); *G06F 2221/033* (2013.01)

(58) Field of Classification Search
CPC ...... G06F 40/216; G06F 21/52; G06F 21/577; G06F 21/6245; G06F 40/30
See application file for complete search history.

(56) References Cited

U.S. PATENT DOCUMENTS

| 9,280,442 B1 * | 3/2016 | Nicolo ................ G06F 11/3604 |
| 9,658,835 B1 | 5/2017 | Venkataramani |

(Continued)

FOREIGN PATENT DOCUMENTS

CN 100461132 C 2/2009

OTHER PUBLICATIONS

Yamaguchi, Fabian, "Modeling and Discovering Vulnerabilities with Code Property Graphs", University of Gottingen, Germany, Qualcomm Research Germany, Feb. 2, 2015, "https://www.researchgate.net/publication/263658395_Modeling_and_Discovering_Vulnerabilities_with_Code_Property_Graphs".

*Primary Examiner* — Vance M Little
(74) *Attorney, Agent, or Firm* — Alpine Patents LLC; Brian Van Osdol

(57) ABSTRACT

A system and method for monitoring and protecting sensitive data that includes identifying sensitive data and statically tracking sensitive data using data flow analysis across a code base, monitoring flow of the data during application runtime, and responding to vulnerabilities according to a sensitive data characterization of the data. Identifying sensitive data includes processing a semantic description of the data in the application code and characterizing the sensitive data. Monitoring flow of the data includes: identifying and characterizing sensitive data through data usage, updating the characterization for the sensitive data through data usage, and enforcing security measures on the data according to the sensitive data characterization of the data.

20 Claims, 8 Drawing Sheets

(56) References Cited

U.S. PATENT DOCUMENTS

| | | | |
|---|---|---|---|
| 10,515,212 B1 * | 12/2019 | McClintock | G06F 21/562 |
| 2007/0240138 A1 | 10/2007 | Chess et al. | |
| 2008/0256518 A1 | 10/2008 | Aoshima et al. | |
| 2009/0307664 A1 | 12/2009 | Huuck et al. | |
| 2010/0017868 A1 | 1/2010 | Hao et al. | |
| 2010/0083240 A1 | 4/2010 | Siman | |
| 2010/0192220 A1 * | 7/2010 | Heizmann | G06F 21/6254 |
| | | | 726/19 |
| 2011/0083190 A1 * | 4/2011 | Brown | G06F 21/6209 |
| | | | 726/26 |
| 2012/0102474 A1 | 4/2012 | Artzi et al. | |
| 2013/0160130 A1 | 6/2013 | Mendelev et al. | |
| 2014/0019490 A1 | 1/2014 | Roy et al. | |
| 2014/0143827 A1 | 5/2014 | Edery et al. | |
| 2014/0282853 A1 | 9/2014 | Velammal et al. | |
| 2016/0224790 A1 | 8/2016 | Gupta | |
| 2016/0352769 A1 * | 12/2016 | Bryant | H04L 63/1408 |
| 2017/0063910 A1 | 3/2017 | Muddu et al. | |
| 2017/0091470 A1 | 3/2017 | Infante-Lopez | |
| 2017/0206082 A1 * | 7/2017 | Abadi | G06F 21/6263 |
| 2017/0316202 A1 | 11/2017 | Roichman | |
| 2018/0349614 A1 | 12/2018 | Ionescu et al. | |
| 2019/0005163 A1 * | 1/2019 | Farrell | G06F 8/36 |
| 2019/0108342 A1 | 4/2019 | Conikee et al. | |
| 2020/0159934 A1 | 5/2020 | Yamaguchi et al. | |

* cited by examiner

| Criteria | Weight | Customer | Account |
|---|---|---|---|
| ClassNames | W1 | S1 | S1 |
| FieldNames* | W2 | S2 | S2 |
| input (in path of) | W3 | Sn | Sn |
| output (in path of) | W4 | -- | -- |

$$\frac{Sum(W_n * S_n)}{100}$$

FIGURE 5

```
public class Customer {
    private String firstName;
    private String lastName;
    private String ssn;
    private String tin;
    private String address;
    ...
}
```

FIGURE 7A

```
Customer goo = new Customer("fname","lname" .....)
```

FIGURE 7B

```
String foo = goo.ssn
```

FIGURE 7C

```
var awsAccessKeys = system.getEnv("AWS_KEYS")
```

FIGURE 8

SYSTEM AND METHOD FOR CODE-BASED PROTECTION OF SENSITIVE DATA

CROSS-REFERENCE TO RELATED APPLICATIONS

This Application claims the benefit of U.S. Provisional Application No. 62/594,368, filed on 4 Dec. 2017, which is incorporated in its entirety by this reference.

TECHNICAL FIELD

This invention relates generally to the field of data leak prevention, and more specifically to a new and useful system and method for code-base protection of sensitive data

BACKGROUND

Data leaks have been an increasing problem as more sensitive data is handled by computer systems. Protecting sensitive data is important for many reasons. The current approaches of modern data leak prevention (DLP) are geared towards protecting data by protecting structured information or unstructured data. Structured data is generally data following a defined schema. For example, current techniques may identify schema definitions in a database or spreadsheet. This technique can be limiting as to the types of data addressed. Unstructured data is data with values that match particular grammars or patterns. For example, various string patterns can be generated to detect potential sensitive data like social security numbers or credit cards. Techniques that rely on regular expressions serve as a performance bottleneck and can depend on rigorous quality assurance on the regular expression pattern. Not covering an edge case may put sensitive data at risk. Doing this process at scale may also not be feasible as it depends on checking grammars at every step adding to the processing cost. Furthermore, it can lead to a large number of false positives. For example, a data object may be flagged as potential sensitive data because it satisfies value pattern, but that does not always mean it is sensitive data. Thus, there is a need in the data leak prevention field to create a new and useful system and method for code-base protection of sensitive data. This invention provides such a new and useful system and method.

BRIEF DESCRIPTION OF THE FIGURES

FIG. 5 is a chart representation of a scoring process;

FIGS. 7A-7C are exemplary code samples across which sensitive data may be identified and tracked;

FIG. 8 is an exemplary code sample were sensitive data may be identified.

DESCRIPTION OF THE EMBODIMENTS

Figure 1:
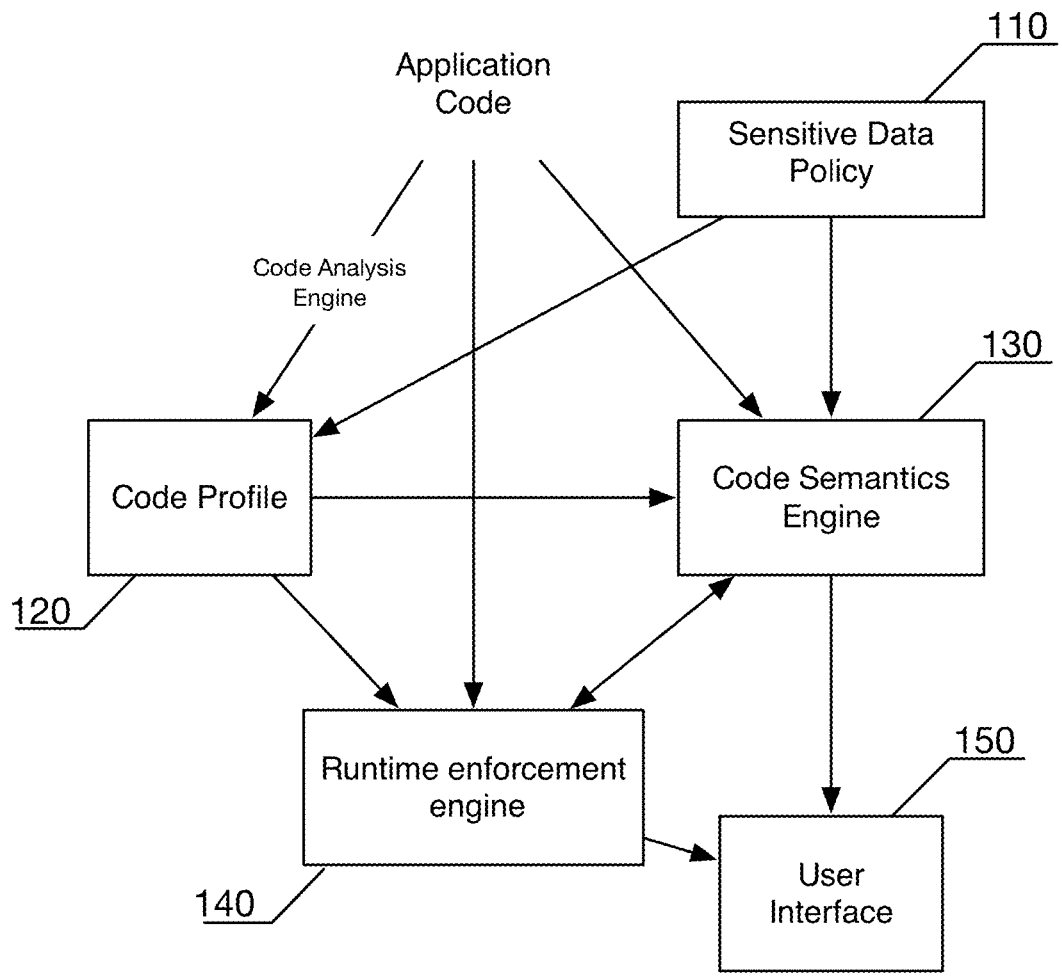
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for code-based protection of sensitive data functions to leverage natural language processing of source to detect and protect sensitive data. Developers will imbue their code with a large amount of contextual information around the purpose and objective of the code when naming code elements, structuring code, commenting, and/or coding aspects of the code base. The system and method preferably analyze such code-associated natural language information to form an understanding of where sensitive data is in play within the code base. Instead of a singular focus on the value of the data, the system and method inspect the context of data in the code and the language used to name and describe the data. This can include inspecting variables, classes, associated data structures, functions, comments, and other aspects as defined in a code base. Such an approach can avoid ambiguities that may be accompanied by processes that only look at data values or tightly defined schemas.

The system and method can additionally leverage code flow analysis to survey semantics and natural language context of data descriptions throughout use of the data. In this way, semantic labeling of data made in one place can be used to understand handling of sensitive data in other portions of the code base.

The system and method can be used as a standalone approach but can additionally be used with other forms of data leak prevention (DLP). In one variation, the system and method can be used with inspecting values during runtime. With a better understanding of what data objects to inspect, the system and method can combine a semantic understanding of the intent of code with data value grammars to possibly achieve a lower false positive rate. Additionally, data value processing can be limited to data objects that have a semantic association with sensitive data for more efficient processing.

The system and method is preferably implemented in connection with a multi-tenant cloud-hosted platform that facilitates use of instantiations of the system and method with applications from various sources. Distinct application developers and administrators can use the system and method that both rely on the cloud-hosted platform. In particular, the platform can offer a web-based dashboard (accessible over the web, an application, and/or an API) to see and manage details for different customer applications. The system and method may alternatively be implemented as a single tenant solution, wherein data leak prevention functionality is instantiated and managed for a single application without reliance of an outside platform.

The system and method is preferably used in the field of data leak prevention. The approach to semantic interpretation of code may additionally or alternatively be applied to other applications of semantic understanding of code.

As one potential benefit, the system and method may achieve enhanced detection and protection of sensitive data. As one aspect, the system and method can detect sensitive data during development enabling data leak prevention reporting and other features without depending on execution of the code. As another aspect, the system and method can additionally be used for protecting sensitive data. A low false positive rate is one potential property of the system and method that contributes to the ability to actively protect sensitive data.

As yet another enhancement to sensitive data protection, the system and method may be less processing intensive—detection of sensitive data is performed primarily during analysis of a code, and therefore monitoring of sensitive data can be restricted to only the portions of code execution that involve the detected sensitive data. Additionally, the runtime processes may be more efficient than current approaches of regular expression analysis of data payloads. Furthermore, the system and method can be used for monitoring of sensitive data in a processed form (e.g., encrypted, hashed, obfuscated) and is not dependent on analysis of raw data payloads for detection of sensitive data.

As another potential benefit, the analysis of sensitive data without execution may be used to enhance the development process. In a rapid development environment, where code may be pushed to production multiple times a day, understanding code impact on sensitive data is critical to avoid exposing an application or service to a sensitive data leak. Mishandling of sensitive data can be detected and addressed before deployment.

As another potential benefit, the system and method can be used during runtime of a code base, enabling DLP in a protection mode. The analysis and monitoring of sensitive data can be applied to augmenting execution and actively preventing data leaks. Augmenting execution can be used to mitigate data leak issues such by blocking network traffic, preventing data writes, or taking other actions.

As another potential benefit, the administrators of the system or method may be alleviated from creating and testing complex data value grammars used to detect potential sensitive data patterns. The way the code base is described in its source code is preferably sufficient to identify and understand use of sensitive data.

As another potential benefit, the system and method can customize protection of sensitive data to a variety of industries or use cases. Different industries or fields will have different terms and names that relate to sensitive data. The healthcare industry will have sensitive data relating to personal identifying information (PII), electronic medical records, and the like. Banks and finance related industries may have sensitive data relating to account names and numbers and other information. The system and method can preferably be pre-configured with capabilities to handle semantics of sensitive data across a variety of use cases. However, the system and method preferably include a mechanism whereby the system and method can be customized for a particular use case.

2. System

As shown in FIG. 1, a system for identifying and monitoring sensitive data of preferred embodiment can include: a sensitive data policy no, comprising of words and phrases pertaining to sensitive data; a code profile 120, wherein the code profile is an application specific analysis of a subset of the application code; a code semantics engine 130, wherein the code semantics engine is configured to identify sensitive data with within an application code with aid of the sensitive data policy; a runtime enforcement agent 140, wherein the runtime enforcement agent is configured to monitor data usage during runtime and enforces security measures on the sensitive data. The system preferably detects and monitors sensitive data, and may additionally initiate one or more responsive actions, such as reporting sensitive data detection or mitigating potential data leaks. The system may additionally include a user interface 150 that reports information and provides a point of interaction for and end user.

The system is preferably instantiated and operated in part as a cloud-based security service. Portions of the system may operate on the cloud and portions on computing resources of a target application. An alternative preferred instantiation of the system may be offered as a code security package run during development and/or deployment, and/or as any suitable software monitoring offering.

The sensitive data policy no, of a preferred embodiment, functions as a language library to help identify and evaluate sensitive data within the application code. The sensitive data policy may provide a language model used in interpreting semantics of the application code. The sensitive data policy 110 preferably includes a dictionary of semantically loaded terms that can indicate sensitive data. The sensitive data policy 110 is preferably a structured text file of different sensitive data terms and their characterizations. The sensitive data policy 110 preferably includes an exhaustive list of terms or word tokens, phrases, and other language elements that define a framework for how sensitive data may be indicated.

The sensitive data policy 110 may categorize the sensitive data terms. For example, in one preferred implementation, sensitive data terms may be classified as: highly sensitive data (e.g., master keys, encryption keys, credit card security codes, etc.), user passwords, internal secrets (e.g., infrastructure keys/passwords, private keys, private/root certificates, etc.), tokens (e.g., access tokens, API tokens, infrastructure tokens, session cookies, etc.), payment data (e.g., credit card data, billing information, bank account numbers, etc.), PII (e.g., first name, last name, address, social security number, date of birth, username/login ID, taxpayer identification number, employer identification number, etc.), medical (e.g., electronic medical record, electronic hospital record, patient, systolic, cholesterol, etc.), and private data. Private data may be further classified as private user data (e.g., user-generated data, user documents, user messages, user contacts/social connections, trade secrets, etc.) and private infrastructure information (e.g., internal IP addresses and ports, host names, service names, infrastructure configuration, S3 bucket names, database names, table names, closed-source code, etc.).

The sensitive data policy 110 may specify a tokenized representation of sensitive terms. Accordingly, a sensitive data policy no include specification of various forms of the terms to account for abbreviations, alternative spellings, and other forms of the term. Some permutations of sensitive data language terms can be automatically generated or detected from a base set of terms such as plural forms, abbreviations, and other word forms. Other permutations of sensitive data language may be expounded through natural language processing techniques and/or machine learning implementations. A default sensitive data policy 110 is preferably provided, which may be supplemented or augmented by additional sensitive data policy 110 configuration.

Libraries called by an application may have their own sensitive data policy no (that may be updated and maintained independently). These libraries in turn may call other functions and/or libraries that also have their own sensitive data policy no. In this manner hierarchies of sensitive data policies may function alongside an application code, wherein these sensitive data policies no may have their own unique language and sensitive data characterizations, or build upon and modify sensitive data characterizations in some hierarchical manner.

The sensitive data policy 110 of an application code preferably contains an edit feature. The sensitive data policy 110 in one implementation may be exposed or edited through the user interface 150. That is, a user or administrator, may add, remove, or modify terms and characterizations within the sensitive data policy no as they deem fit. Depending on the implementation, the level of user access, and/or other details of the system, there may be limits to editing the sensitive data policy no. For variations with multiple sensitive data policies no (e.g. multiple library sensitive data policies), there is preferably a user administered general sensitive data for the application, wherein library sensitive data policies may be obtained and administered by other sources (e.g. organization that maintains the library, public repository, purchase from a private vendor).

A code profile of a preferred embodiment 120 functions as a manifest interpretation of the components of an application code. That is, the code profile 120 enables monitoring and enforcing application controls, that can have security and functional implications for the application. The code profile may additionally or alternatively enable other functionalities for the application. The code profile 110 may be generated from a control property graph (CPG). Code analysis and interpretation of the code profile 120 can detect certain parts of the code that have some implication on the data type, handling of data, and interactions with outside systems or code, giving contextual understanding of the application code. Preferably, code analysis and interpretation of the code profile 120 identifies sensitive data and aids in monitoring the sensitive data during the application runtime. From the code profile 120, a runtime security agent may select or determine particular security events of interest and/or instrumentation specifications for monitoring of the application code during execution.

The code profile 120 is preferably for a particular scope of code. Additionally or alternatively the system may contain multiple code profiles for subcomponents of the application code. Thus, a code profile 120 may be generated for an entire base code, or for one or more sections of code (e.g. a code profile 120 for a specific function within the code). Additionally, code profiles 120 may be generated for dependencies of the base code, such as modules, and external libraries that are called on by the base code. Any other variations or alternatives of the application code and/or application code dependencies may be implemented to generate the code profile 120. Additionally, nested hierarchies of code profiles 120 may be generated, wherein potentially overlapping code profiles 120 for a subset of the application code and/or a code profile 120 for the entire application code are created. Nested code profiles 120 can enable greater focus on sections of the application code.

The code profile 120 is preferably a code property graph (CPG). Alternatively, the code profile 120 may be any suitable model of the code based on the application code (more specifically, the development/production application code). In a preferred implementation, the system may acquire a code profile 120 using a code analysis engine. Alternatively, a code profile 120 may be retrieved or produced through alternative mechanisms. In one preferred implementation, the code analysis engine preferably includes a first code analysis tool that extracts the CPG.

The CPG represents operational relationships such that execution and data flow can be traced through the base code and its constituent frameworks and libraries (i.e. dependencies). The CPG can be used to characterize potential vulnerabilities. The code analysis engine preferably includes a second code analysis tool that traverses the CPG and generates a code profile 120 using the relationships and execution and data flows within the CPG.

The code property graph is preferably a joint data structure, or model, which may be composed of an abstract syntax tree (AST) subcomponent, a control flow graph (CFG) subcomponent, and/or a data flow graph (DFG) subcomponent. The CPG may alternatively be characterized using any suitable format. The joint data structure CPG may include a node for each subcomponent for each subject and predicate the base code. The CPG preferably enables efficient processing and analysis of the base code by enabling efficient graph traversals. The CPG is preferably a serializable data structure, which can enable efficient generation, transmission, and distribution of the code profile 120 across various machines. Being easily transmitted can enable parallelized processing of the CPG, which can be leveraged in efficient traversal of the CPG in analysis of interaction flows between various points of interest in the application code. A CPG can additionally be established for different segments and/or dependencies of the code base. For example, CPGs can be extracted from libraries that are called by the code base and/or distinct subcomponents of the code base. Extracting a CPG for these different segments may additionally help focus and identify locations of interest within the code base. For example, a library CPG may help identify a code base variable that has gone out of its valid parameter range.

An AST functions to characterize the structure and syntax of the code. An AST may faithfully encode how statements and expressions are nested to produce programs. A code parser can create an AST as an ordered tree where inner nodes represent operators and leaf nodes match operands.

The control flow graph (CFG) functions to characterize the functional flow of execution within the code as well as conditions that need to be met. The CFG can preferably represent sequential and/or possible sequences of execution. The CFG is comprised of statement and predicate nodes, which are connected by directed edges to indicate transfer of control. A statement node has one outgoing edge, and a predicate node has two outgoing nodes corresponding to true and false evaluation of the predicate. The CFG preferably characterizes the calls between functions in the code, the conditional branches within the code, and/or other elements of control flow. For example, a statement preceding an if-statement will have an association into the if-statement or over the if-statement within the CFG. The CFG may be used to determine the execution flow in base code.

The data flow graph (DFG) functions to show the operations and statements that operate on particular pieces of data. Traversing the edges of the graph can indicate the flow of data. The DFG can additionally capture possible operations. The DFG may additionally identify sensitive data flows and aid in evaluating the level of vulnerability of these sensitive data elements.

The AST, CFG, and DFG are preferably combined into a joint data structure as the CPG, which make up the code profile for an application. The three graphs AST, CFG and DFG each have nodes that exist for each statement and predicate of the source code. The statement and predicate nodes can serve as a connection point of the three graphs when joining to form the CPG. Through the three subcomponents, CPG may contain information about the processed code on different levels of abstraction, from dependencies, to type hierarchies, control flow, data flow, and instruction-level information. Passes over the CPG may allow inspection of the application code structure, control flow, and data dependencies of each node, and thus traversing and/or making queries into the CPG may give better understanding of the application code (e.g. by identifying vulnerability patterns and sensitive data).

Because of the properties of the CPG, the code profile 120 can preferably be broken down into a set of components that in combination can encapsulate vulnerabilities of the application code. The code profile 120 could include components broken down by: interface channels, data, interaction flows, dependencies, and/or API elements. Additional or alternative components may additionally be used. For example, the code profile 120 could break down the various interface channels to outside systems, instances of data of interest, the various interaction flows of data to different interface channels, and dependencies on external libraries. Some of the components may be more applicable to certain types of code bases (e.g., libraries vs. web applications) and/or implementations (e.g. security, privacy).

The interface channels function to characterize the input/output associated operations of the application code. Interface channels may represent every way the application code interacts with the outside world. The interface channels of the application code of interest are preferably described within the code profile 120. An application code (or process) will have at least one interface channel component if the application has a statement establishing communication with an outside system. An interface channel component can output data to an outside system and/or receive data from an outside system. An interface channel could be contained directly within the application code (e.g., a process of the application code accesses or interacts with a network, database, file, etc.) or indirectly (e.g., a used library or module accesses or interacts with a network, database, file, etc.). In preferred variations the interface channels aids in locating points where sensitive data may be vulnerable. Instances of interface channel components can have attributes such as a type, read/write mode indication, description, address, method, protocol, data received, data sent, channels received from, channels sent to, and/or other suitable attributes.

In one implementation, interface channels for sensitive data can be identified by statements that are tagged or detected to perform some action with an outside system. This implementation may further function with the sensitive data policy 110 that contains pre-tagged statements that the code profile 120 may use (or be implemented within the code profile). Statements triggering system calls and/or other types of statements could be tagged as such. Generally, an interface channel can be detected by traversing the CFG from system call statements or other tagged statements and incorporated into the code profile 120. For example, an application could be detected to make use of a set of interface channels by tracing associations through libraries and frameworks to underlying system calls.

The data components function to identify particular types of data of the application code. In a preferred variation the data components identify sensitive data components. The data components called out are preferably sensitive data that may be particularly exposed. Data components may have a number of attributes such as type, template, and name.

The types of data components can include data classifications such as attacker controlled, sensitive data (credit card numbers, SSN, etc.), secrets (e.g. credentials, passwords, etc.), user data, personal identifiable information, user generated data, internal data, public data, and the like. The type of data component can be determined through pattern recognition on the codebase. Preferably, natural language processing can analyze class names, object names, structure names, variable names, runtime value patterns, data validation patterns, comments, documents, and/or other aspects to classify data. A template property can indicate the type of object such as a class, object, structure, variable, or other form of data. Additionally, a data component can include attributes to indicate data flow to an interface channel, from an interface channel, to an interaction flow, or from an interaction flow. A data component could additionally include an attribute indicating if it is protected by authentication/authorization layer and the type or properties of protection (e.g., form based authentication, basic authentication, 2-factor, token based, handling password resets, OAuth & OAuth 2, JWT, password strength policy, session cookie, crypto strength, etc.).

Figure 3:
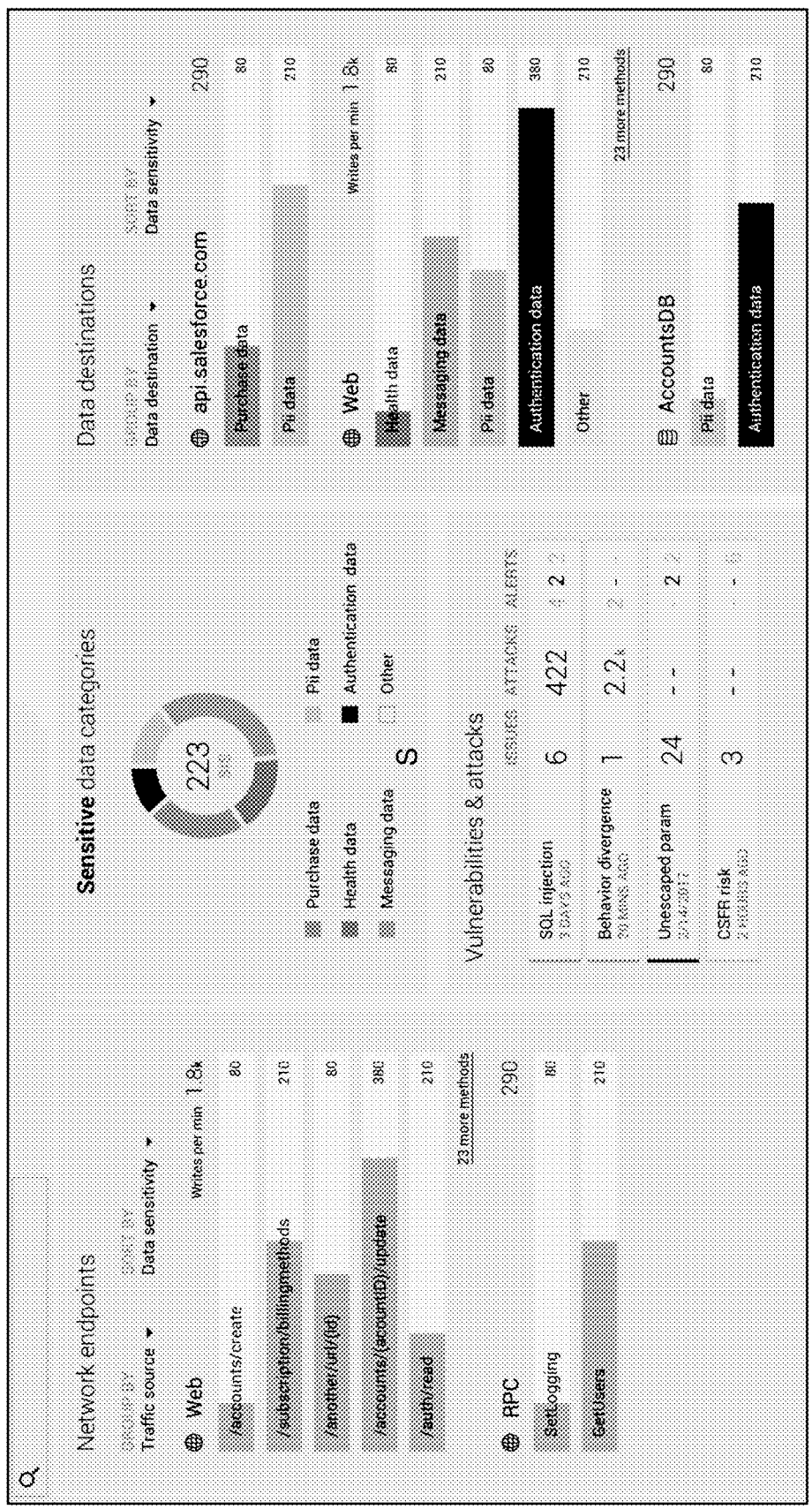
FIG. 3 is an exemplary dashboard reporting sensitive data analytics.

Sensitive data is preferably a data type of interest. Sensitive data may include credit card numbers, pin codes, SSNs, etc. Using natural language processing techniques and a default dictionary of indicative terms, sensitive data types may be identified by their name. Tagging directives may be used to mark data as sensitive. Sensitive data may additionally be characterized with a sensitive data score, as shown in FIG. 3, and how exposed the sensitive data is.

The interaction flow of the application code functions to represent the interaction of a profiled component, such as the sensitive data and the interface channels. Interaction flows of the application code may be extracted to the code profile graph 120. Tracing the CFG of the CPG may allow tracking the flow during application execution and tracing the DFG may allow tracking data, data relationships, and all uses of variables. By traversing the CFG and the DFG, the flow data may be incorporated within the code profile 120. Depending on the modeling architecture, the flows can be modeled as independent components or as properties of the data and/or interface channels as was indicated above. An interaction flow can indicate the interaction channels from which data flows or to which data flows.

The dependency components function to represent the library, module, or other application code dependencies. Dependencies may, additionally or alternatively, include internal dependencies. Dependencies may be incorporated within the code profile 120 from the CPG. Each dependency component may have attributes indicating properties like if its deprecated, classified as insecure or vulnerable, bus factored (high volume of committers added/leaving), unmaintained, license violation, or outdated. The API components function to represent the exposed programmatic interfaces of the application code. API components may be generated into the code profile 120 from the CPG. API components can be particularly applicable to a library, code module, or application that may expose programmatic interfaces for interactions by other parties. In a library, this can include the exposed function calls for users of the library.

Figure 2:
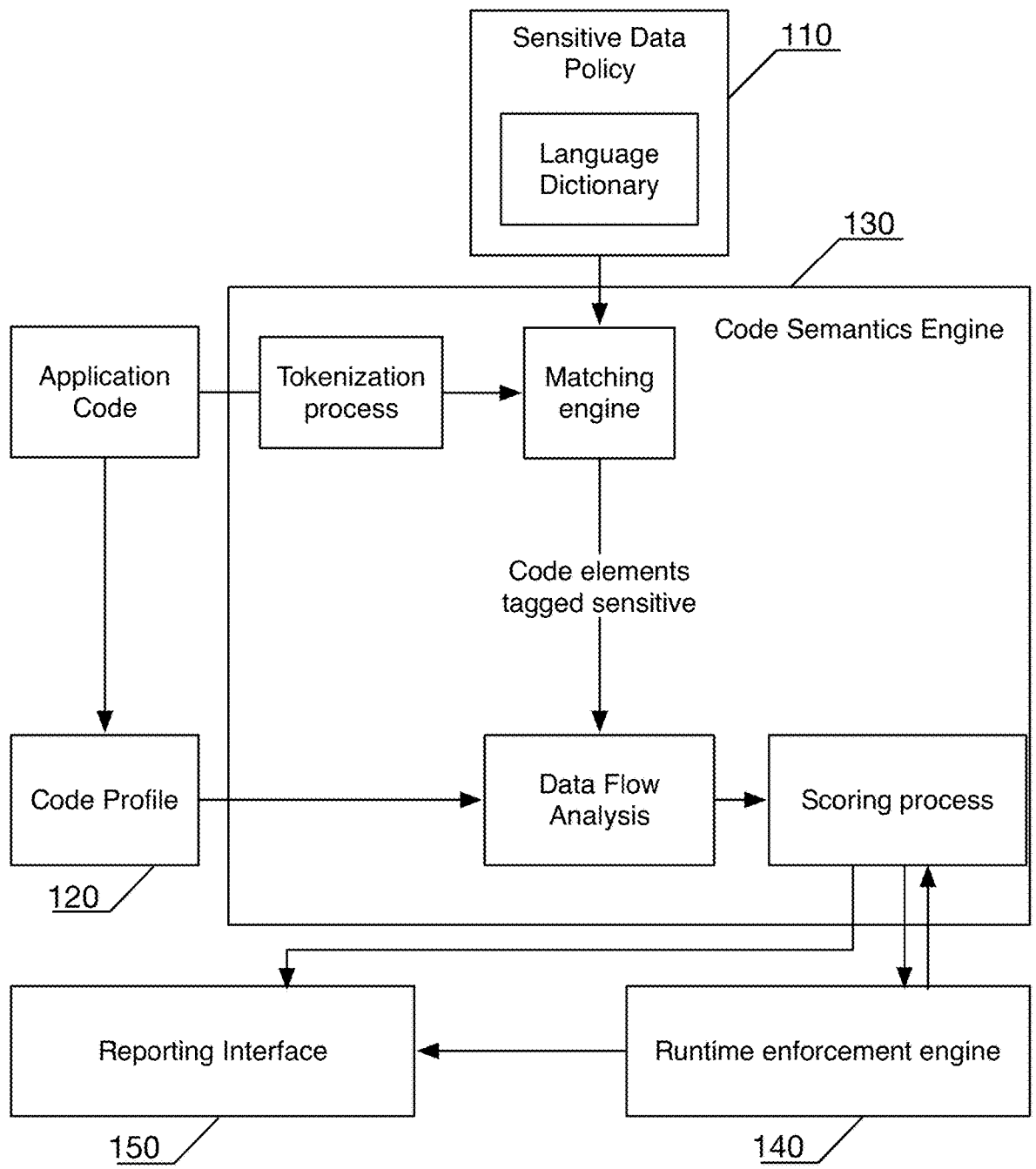
FIG. 2 is an alternate schematic representation of a system of a preferred embodiment.

The code semantics engine 130 of a preferred embodiment functions to identify sensitive data from semantic aspects of the application. The semantic aspects preferably include comments, code documentation (e.g. inline code commentary), and function and variable names. The code semantics engine 130 preferably processes the code profile 120 using a sensitive data policy 110 in interpreting the semantic signals for sensitive data. FIG. 2 shows a different organization of a system of preferred embodiment with outlined details of the code semantics engine 130. The code semantics engine 130 preferably includes a tokenization process, a matching process, a scoring process, and/or a data flow analysis process. The code semantics engine 130 preferably operates prior to the application runtime, but in some variations the code semantics engine 130 may operate simultaneously and even in conjunction with the application execution and the runtime enforcement engine 140.

The tokenization process is configured to normalize data descriptions from the code profile 120. The natural language content of the application code is preferably tokenized by selecting the elements in the code base that are eligible for natural language processing and then analyzing them through the tokenization process. In one variation, the elements can be converted to a tokenized representation. A tokenized representation may partition phrases using a set of tokenization patterns that will generally relate to naming conventions like letter-case separators (e.g., CamelCase), delimiter-separated words (e.g., snake case). The sensitive data policy preferably specifies sensitive terms in a corresponding tokenized format. Various natural language processing techniques may additionally or alternatively be used.

The scoring process of the code semantics engine 130 preferably assesses semantic processing of the code across various aspects to output a sensitive data score. The sensitive data score is preferably dependent on the type of the sensitive data which may be assessed by the code semantics engine 130. Additionally, the sensitive data score may be dependent on how the sensitive data is utilized which may be determined with the data flow analysis. For example, sensitive data that is accessed by many external components or stored in unencrypted logs may be considered more vulnerable, and thus received a higher sensitive data score. The code semantics engine 130 preferably functions in conjunction with data flow analysis process, and may additionally utilize the code profile 120 and sensitive data policy 110 to determine the sensitive score for the sensitive data.

The data flow analysis process of the code semantic engine 130 functions to analyze how sensitive data is used across the application code. The data flow analysis process can be configured to identify flows with sensitive data and examine conditions of use of that sensitive data. In particular, the data flow analysis process can examine if the input(s) and output(s) of a data flow involving sensitive data violates some condition. The sensitive data score can be reinforced or updated based on the output of the data flow analysis process. As mentioned above, data flow analysis process preferably occurs in conjunction with the code profile 120 and sensitive policy no.

The runtime enforcement agent 140 of a preferred embodiment functions to augment operation of the application based on analysis of sensitive data. The runtime enforcement agent 140 preferably identifies and monitors data flows during runtime. The runtime enforcement agent 140 may identify if sensitive data flows are triggered in runtime. Dependent on the sensitive data type and sensitive data score for the sensitive data the runtime enforcement agent 140 may take corrective actions to aid in securing the sensitive data. Examples of corrective actions may include: issuing warnings (of different degree and specificity), blocking "risky" data flows (e.g. transferring sensitive data to an unencrypted external server), and/or enforcing secure utilization of sensitive data (e.g. preventing the utilization of the same password multiple times).

The runtime enforcement agent 140 may additionally augment the detection and analysis of sensitive data. In one variation, the runtime enforcement agent 140 can reinforce or update the sensitive data score based on reported usage of the data. In another variation, the runtime enforcement agent 140 can apply other forms of sensitive data detection such as analyzing data values for potentially sensitive data objects.

In some variations the runtime enforcement agent 140 may additionally tag and monitor sensitive data outside of the system. In this manner, the runtime enforcement agent 140 may additionally determine how the sensitive data is maintained and utilized outside of the system. The enforcement agent 140 may then take corrective actions, as necessary and possible, with regards to the sensitive data.

The system may further include a user interface 150. The user interface of a preferred embodiment functions to allow user interaction with the system and to provide a medium to present the user with information. The user interface 150 preferably enables inspection and analysis of the sensitive data and the system in general. Data and data analysis can be accessed and presented in some interfaces. The user interface preferably enables a user to modify the security data policy no, the security data score for a sensitive data, and alter how the runtime enforcement agent 140 functions with respect to the sensitive data. The user interface 150 is preferably a graphical dashboard such as the one shown in FIG. 3. The user interface 150 can be a programmatic interface like an API, a notification interface, or any suitable form of an interface.

3. Method

Figure 4:
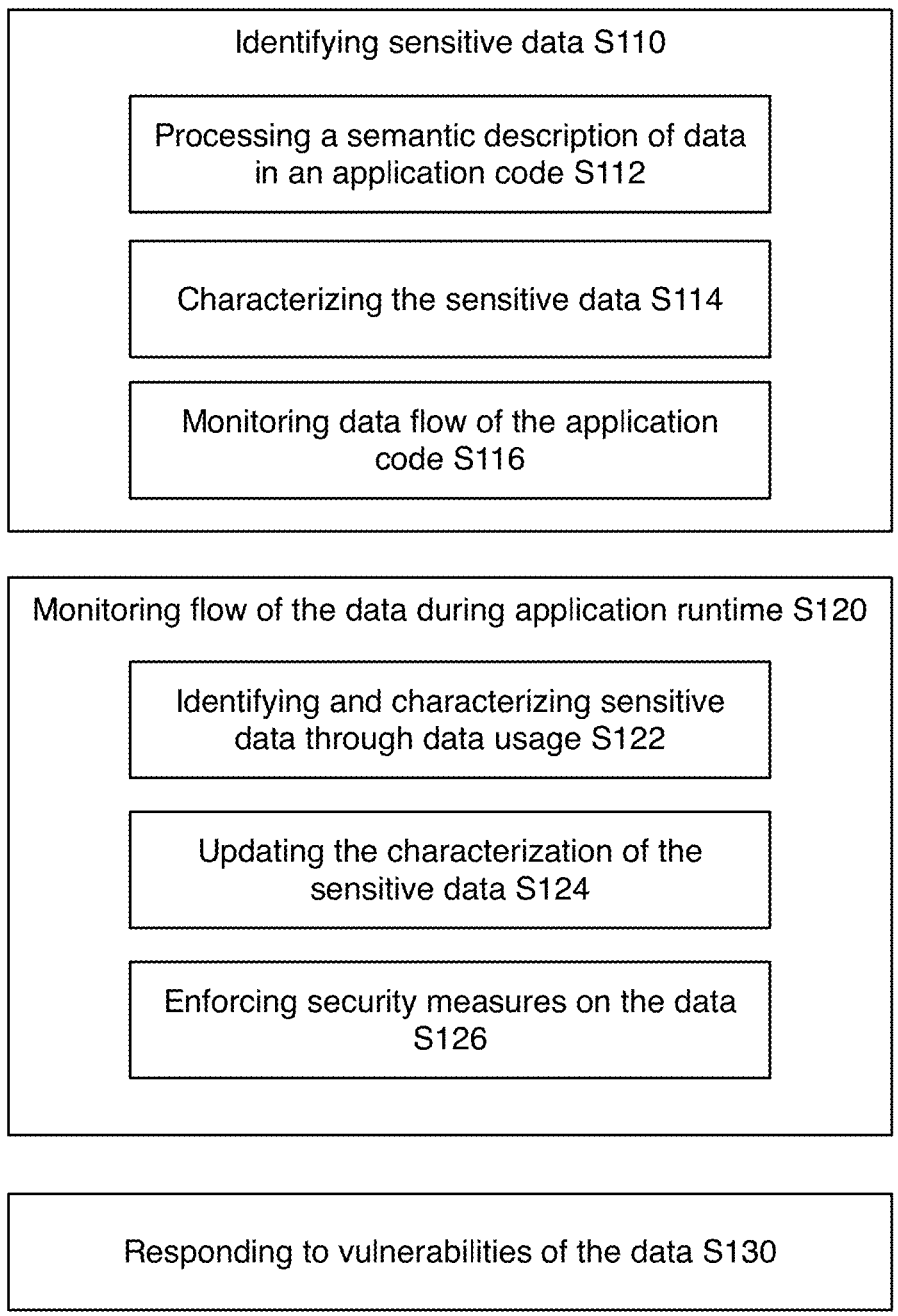
FIG. 4 is a flowchart representation of a method of a preferred embodiment.
Figure 6:
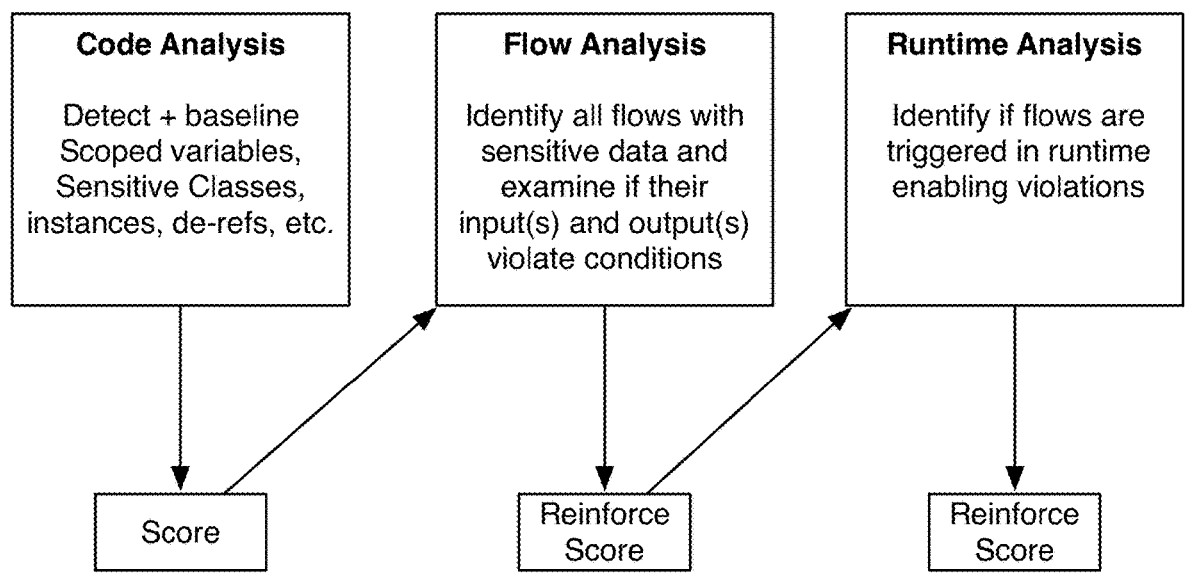
FIG. 6 is a schematic representation of different stages of scoring sensitive data.

As shown in FIG. 4, a method for monitoring and protecting sensitive data includes: identifying sensitive data S110, monitoring flow of the data during application runtime S120, and responding to vulnerabilities of the data S30. Identifying sensitive data S110 preferably includes processing a semantic description of data in an application code S112 and characterizing the sensitive data S114. Monitoring flow of the data during application runtime S120 preferably includes identifying and characterizing sensitive data through data usage S122, updating the characterization of the sensitive data S124, and enforcing security measures on the data S126. The method may function in identifying and characterizing sensitive data prior to and during an application runtime and aid in monitoring and protecting the sensitive data. As shown in FIG. 6, the method may enable identifying and characterizing sensitive data through analyzing code, analyzing data flow through the application code, and analyzing data flow during application runtime.

The method preferably leverages (and promotes) the fact that data in code will generally implement naming and documentation conventions, that when using good development practices, will have meaning related to the purpose of the application code. This is primarily done for readability and for creating maintainable code. The method preferably uses the naming of code elements and code comments to interpret and detect sensitive data code objects. Furthermore, the method leverages the fact that application data will be utilized (e.g. passed to functions, logged, modified, shared, etc.) thus creating data flows. Data flows are functions, processing sequences, and other actions in code that initialize, transform, manipulate or otherwise use data. Data flows can be interconnected. The method can additionally process data flow as it relates to detecting and understanding aspects of a code base that relate to handling of sensitive data. In some instances, a data object may have clear semantic indicators signaling that the data object relates to sensitive data. However, as the data is passed through a data flow in an application, there may not be semantic indicators at other points of data usage. It is sometimes at these contextually removed portions of a data flow (e.g., where sensitive data is a child property of a generic data object with no implied sensitivity) where management of sensitive data is critical. Data flow analysis can trace data objects to parts of the code where there is a semantic and natural language indicators. Accordingly, the method can enable monitoring and/or regulation of sensitive data management.

The method preferably monitors and protects any type of desired sensitive data regardless of type, size, and functionality. Sensitive data may be a single low-level variable, but may additionally or alternatively be a complex data object. Specific data object elements may be sensitive data or subgroups of a data object may be sensitive data. Sensitive data may include sensitive data of any level of "sensitivity". Additionally sensitive data is preferably context/application specific and may be as subjective or objective as desired. Sensitive data examples may include: root password, account password, social security number, bank account number, user profile, user name, user password, person's age, person's name, person's favorite color (potentially being a security question). The method may additionally distinguish between types of sensitive data such as highly sensitive data, internal secrets, user passwords, PII, payment data, medical data, private user data, private internal data, and/or other suitable types of sensitive data. The different types of sensitive data may have different degrees of sensitivity and handled accordingly by the method.

The method is preferably implemented by a system such as the one described above, but any suitable system may alternatively be used.

Block S110, which includes identifying sensitive data, may function in determining which data elements are sensitive data. Identifying sensitive data Silo preferably includes processing a semantic description of data in an application code S112 and characterizing the sensitive data S114. Block S110 preferably functions at an application (or "sub-application") level, wherein identifying sensitive data Silo identifies sensitive data within the application code and/or libraries and dependencies of the application code.

Block S112, which includes processing a semantic description of data in an application code, preferably functions in identifying sensitive data from language elements within an application code. Processing a semantic description of data in an application S112 may include applying natural language processing and/or using machine learning techniques. Processing a semantic description of data in an application S112 can preferably detect multiple data objects (or simple data variables) in the application code as sensitive data. Block S112 may detect the sensitive data through the semantics that are used with code elements and code commentary associated with the data object.

Language elements preferably include data element names in the application code and code documentation. Data element names within the application code may include variables and variable object names. For example: a numerical variable named SSN may be identified as sensitive data pertaining to a social security number or a data object named <user>.profile may identify personal (sensitive) data pertaining to a user's personal information. Data element names may additionally include other types of in-code language, such as function names. Code documentation preferably comprises of in-code documentation, i.e. comments. Comments may be single in-line comments, or longer, more verbose, descriptions. Code documentation may additionally include any other type of code documentation within, or separate, from the application code. The data elements can be any suitable part of the application code that may be used in assessing semantics. Selection of application code elements and how they are analyzed can differ depending on application itself, language, framework, environment, libraries, and/or other factors. Application code elements that may generally be analyzed include class names, names in data structure (e.g., field names, structs, etc.), instance variables, dereferences of a data object, function names, data structure names, documentation, comments, and/or other code elements. The application code data elements may be tokenized and processed.

Preferably, the semantic description of data objects is interpreted with consideration of the functional organization/interpretation of the application code. For example, a customer data object with attributes that indicate it to be sensitive data can be detected as such as shown in FIG. 7A. Sensitive data identification can also be symmetric for class instances—if a class is tagged sensitive, then all its instances (based on type) are sensitive. For example, if "goo" is an instance of a Customer class that is a sensitive data object then it would be identified as sensitive data as shown in FIG. 7B. Sensitive data identification can be transitive—if an instance is sensitive, then de-referenced assignment (based on type) are sensitive. For example, instance variable "foo" can similarly be labeled as sensitive data as shown in FIG. 7C. Scoped variables may also be semantically processed and used in identifying sensitive data in the other direction like in the example shown in FIG. 8 where awsAccessKeys (possibly tokenized as "aws", "access" and "key") can be used in semantically detecting a data object that is sensitive data. Code documentation will similarly be semantically processed and used in interpreting sensitivity of associated code data elements.

Processing a semantic description of data in an application code S112 preferably also includes tokenizing code relating to data and matching the tokenized code elements to a sensitive data policy, wherein a sensitive data policy may function as dictionary of sensitive data language elements. Tokenizing code relating to data, may function to normalize code elements to simplify natural language processing. Tokenizing the application code preferably converts the application code elements into a consistent format that can be compared to a dictionary of sensitive data terms. These terms may be terms maintained in a sensitive data policy, be considered generally known terms, determined from the application code or application code profile, or from some other source. These terms may be terms maintained in a sensitive data policy, generally known terms, determined from an application code profile, or from any other location. Application code elements will often have some form of delimited naming semantics such as snake case, camel case, or the like. These naming approaches can be transformed to a normalized format. For example, camel case, snake case, or other naming patterns can be converted to a space-delimitated list of naming units. The naming units can additionally be case normalized. For example, all characters can be converted to lower case. Any suitable form of normalization may additionally or alternatively be performed.

Matching tokenized code elements to a sensitive data policy is preferably a component of processing a semantic description of data in an application code S112. Matching tokenized code to a sensitive data policy may functions to use language used in the application code to detect data objects potentially being, containing, or otherwise relating to sensitive data. The matching process preferably examines definitions of data based on a language model. The language model preferably characterizes how sensitive data is characterized in human language within code. Preferably, the language model can be defined as a dictionary of different terms. The different terms can include various terms, term combinations, term roots, and/or other term patterns that can indicate sensitive data. This matching process can be performed for each tokenized code element. For example, the matching process can include matching the class name, instances of a class, dereferencing variables, instance variables (scoped local or global), and/or other code elements against a dictionary of sensitive data terms.

The language model and dictionary are preferably maintained in a sensitive data policy, but may be maintained, accessed, and/or obtained from other sources. The dictionary, as discussed above, can be customized for different applications, different application implementations, and even distinct application executions.

The matching tokenized code to a sensitive data policy can additionally include various approaches to matching to the dictionary of terms. In one variation, string distance or similarities can be assessed for the code elements. String distance techniques such as Levenshtein, Jaro Winkler, Jaccard, ShingleBased, and/or other suitable techniques can be used. In another variation, prefix trie pattern searching, wildcard trie pattern searching, and/or other techniques could additionally or alternatively be used in comparing tokenized code element names to the dictionary.

While a sensitive data policy implementation may be preferred for processing a semantic description of data in an application code S112, method variations can additionally or alternatively use other natural language processing techniques. In one variation, identifying sensitive data (and more specifically processing the semantic description of data) can include applying a machine learning classification model and thereby identifying at least one sensitive data in the application code For example, a machine learning model can be built based on training data relating to natural language semantics and their "sensitivity" classification. In one variation, a developmental tool can facilitate developer labeling of sensitive data objects within their coding environment. In one example a UI may be integrated into the development IDE that enables a convenient mechanism for labeling/classifying sensitive data. In another variation, the UI may graphically highlight code elements automatically identified as sensitive data. A developer could alter these labels if inaccurate. Additionally, the highlighting of sensitive data could be performed across the data flow. In another variation, an editable policy text/configuration file included with the source code of an application project can serve as input for the sensitive data policy or other parameters of the method. Similarly, annotations within the code itself may follow a pre-defined format or standard. These may be detected and processed to apply the sensitive data directives. The labeling data can be used within that application directly. Additionally, the labeling data may be collected and used collectively across multiple applications in training a machine learning classification model for automatic classification of sensitive data.

Block S114, which includes characterizing the sensitive data, may function in determining the type of the sensitive data and scoring the sensitive data. Types of sensitive data may include passwords, bank account numbers, credit card numbers, personal information, and/or any other type of data that one would like to keep secure at some level of privacy. In a preferred variation, the types of sensitive data are context based on the application and may be categorized differently (or even contrary) to implementation of the method with a different application/usage. Examples of different types of sensitive data include: user passwords, internal secrets, tokens, payment data, PII, medical history, and private.

Characterizing the sensitive data S114 preferably includes scoring the sensitive data. That is, giving the sensitive data a characterization of urgency and/or importance with respect to maintaining the sensitive data secure and/or private.

Scoring the sensitive data functions to give a security assessment of the sensitive data, thereby enabling a tiered response in protecting sensitive data. For example, with regards to a password type sensitive data, a root password may have a higher sensitive data score as compared to a computer password, which may itself have a higher sensitive data score as compared to a web profile password. These three distinct sensitive scores, for three different types of passwords, can thus enable three tiers of response to securing the password. As discussed previously, the sensitive data score is also preferably context/application based. For example, user profile information may generally have a lower sensitive data score as compared to passwords. Thus, greater levels of security measures may be incorporated to protect a password as compared to personal user information.

Different types of scoring may be implemented for scoring the sensitive data. In some preferred variations, the sensitive data score may be a numerical sensitive data score, which functions to measure level of sensitivity as a metric. In one numerical scoring approach, way a set of criteria are scored and combined according to different weights as shown in FIG. 5. In another preferred variation, characterizing the sensitive data score may include classifying data into a group of distinct, finite number, of classifications. Classification scoring of the data may apply a classification label to data according to labeling or classification mappings set in the sensitive data policy. The scoring process can depend on the semantic processing of S112, but may alternatively or additionally include criteria relating to data flow analysis in Block S122 or during runtime analysis. In one example, the set of criteria include name-based criteria of class name and field names and context-based criteria for having a data flow being associated with an input or an output. The score can additionally be updated at different stages of analysis as shown in FIG. 6. Alternative types of sensitivity scores may be implemented as desired. Preferably, only one method of scoring is implemented for a given type of sensitive data and more preferably all data. Alternatively, multiple methods of scoring may be implemented for one type of sensitive data. As shown in FIG. 3, a set of classifications sensitive data types can be monitored and individually scored, which may be presented in a user interface Identifying sensitive data S110 may further include incorporating a sensitive data policy to aid in identifying sensitive data. The method may additionally include defining a sensitive data policy which can include a default sensitive data policy and/or a customized sensitive data policy. As described previously, the sensitive data policy may function as a dictionary of terms, phrases, and other language elements that identify and characterize sensitive data and/or aid in identifying and characterizing sensitive data within the application code. As mentioned previously, the sensitive data policy may aid in matching tokenized elements of the application code and thus identifying sensitive data S110. In one implementation, the sensitive data policy is a list of word tokens and a mapping to a classification type of sensitive data (or alternatively some numerical scoring measure). In some variations, identifying sensitive data S110 may incorporate multiple code policies. Multiple code policies may overlap or cover distinct parts of the application code. In some variations, code policies may be embedded within each other or cover different levels of hierarchy of the application code. For example, the identifying sensitive data S110 may incorporate may employ one encompassing code policy for the application code and several other code policies for dependent libraries of the application code and application subroutines. In some preferred variations the code policy is user editable such that an end user or administrator may add, remove, or change terms in the code policy; and add, remove, or change characterizations of the terms within the code policy.

Identifying sensitive data S110 may further identify and characterize sensitive data by monitoring data flow of the application code S116. Monitoring data flow of the application code functions by using a code graph to understand how data objects are used within the application prior to execution by statically tracking sensitive data using data flow analysis across a code base. Monitoring data flow of the application code may include generating a code property graph (CPG) from the application code (i.e. a code profile). Alternatively, the CPG may have been previously generated and/or is supplied to the method. Data objects, in particular data objects tagged as sensitive data, are preferably analyzed by how they would flow through application execution. Monitoring data flow of the application code may include detecting the inputs that feed into a data object, and outputs where a data object is transferred or exposed. Additionally, transformations of the data objects (e.g., encrypting, encoding, hashing, obfuscating, and/or otherwise transforming) along the data flow may additionally detected and monitored. Tracking of data transformations prior to data output (e.g., writing to a database) may be used to interpret handling of data objects as secure or not. Different classifications or scores of sensitive data may specify different data transformations for different forms of outputs. As the data flow of the sensitive data is traced, additional application code elements associated with a data flow of the sensitive data can be tagged as sensitive data, characterized, and similarly traced. The data flow analysis of the code can then be used in generating or updating the sensitive data score of monitored sensitive data elements.

Generating a code profile may function in providing an application specific CPG to analyze data flow within an application code. The code profile can offer a tangible artifact that is usable in understanding the nature of an application code. The code profile is an application specific CPG, wherein the CPG includes a data flow graph of the application code and a control flow graph of the application code. The code profile may be generated using a code analysis engine. The graph structure of the CPG may convert a code analysis problem into a graph theory problem, potentially reducing the computational power required to solve the problem. That is, because of the graph structure code analysis may be done using parallel processing in clusters and allow for more efficient caching of data. Interface interactions of the code profile may be generated by tracing the flow of interfaces of a control flow graph component of the CPG. Data interactions of the code profile may be determined tracing the flow of data on the data flow graph component of the CPG. The code profile may preferably be generated conjointly from the application code and the sensitive data policy. Alternatively, the code profile may be generated without a sensitive data policy.

Block S120, which includes monitoring flow of the data during application runtime, functions to track and analyze utilization of data elements of the application. Monitoring flow of the data during application runtime S120 preferably tracks and analyzes sensitive data during the application runtime but may additionally follow other data elements and interactions. Monitoring flow of the data during application runtime S120 preferably includes identifying and characterizing sensitive data through data usage S122, updating the characterization of the sensitive data S124, and enforcing security measures on the data S126. Monitoring flow of the data during application runtime S120 may include monitoring input/output calls, monitoring input and output data associated with the input/output calls, monitoring activity with various types of data, and monitoring function calls. Block S120 may additionally or alternatively include tracking and analyzing other application related information (e.g. such as external application interactions). Monitoring flow of the data during application runtime S120 may be used in tracking events and/or actions related to sensitive data. Block S120 may further include collecting metrics with respect to the data, which can then be analyzed and/or reported.

Monitoring flow of data during application runtime may include, instrumenting the application with a runtime agent, which functions to enable the runtime agent to track and monitor the data and/or execution flow. The execution flow is the trace of the series of controls as they are utilized by the application at execution. In one preferred implementation, instrumenting the application with a runtime agent may include integrating the runtime agent with the application and tagging flows of the control in accordance with sensitive data objects identified in block S110.

A runtime agent can have different modes of operation during application execution, monitoring the data and/or execution flow, detecting potential sensitive data leaks, enforcing certain rules and actions on sensitive data, and/or reporting those occurrences.

Depending on the programming language, instrumenting the application with a runtime agent may occur prior to, during, or after compilation of the source code. For example, precompiled languages (such as C) may incorporate the runtime agent prior to or during compilation, while a post compiled language (such as Java) may incorporate the runtime agent at the time of execution. In some preferred variations the runtime agent is written using a cross-platform programming language (e.g. Lua), enabling implementation of the runtime agent with applications written in multiple programming languages. In these variations instrumenting the application with a runtime agent may include instrumenting the application with a language "agnostic" runtime agent. Alternatively, instrumenting the application with a runtime agent S120 may preferably include instrumenting the application with a language specific runtime agent. A language agnostic runtime agent may enable the use of a single runtime agent with a program that is written using multiple computer languages.

Within a Java-based application, an application can be modified to include a runtime agent. In one preferred variation, the runtime agent is added as an extra jar to the JVM runtime via the -javaagent JVM flag. This added extra jar can detect when other jars are loaded in and can alter their byte code before they are executed in the JVM. This instrumentation preferably enables operation metering and alteration of that application process.

In C, C#, Golang, and other languages that do not use virtual machines, the runtime agent implementation may use an OS mechanism. For example, LD-preload can be used to insert agent functionality into attempts to access OS resources. The communication to the OS calls can be modified to track and/or modify actions. In kernel space, Berkeley Packet Filtering (BPF) may be used for security auditing of the runtime agent.

In one implementation, a compiler can be configured to compile application code to include jump statements or other suitable callout functionality to perform runtime agent specific operations in connection with particular events. Such statements are preferably added to method calls and can be used to track the sequence of method calls related to sensitive data flows. In an alternative implementation, usable for Golang and possibly applicable to other languages, the instrumenting an application may add native instrumentation through trampolines wherein jump statements are inserted at the beginning or the end of methods. A compiler can be configured to insert no-op instructions, and later binary modification can then include replacing the no-op instructions with jump statements to instrumentation instructions. The instrumentation instructions are preferably configured to return execution flow to the location after the jump statement after completion.

Instrumenting of the runtime agent may be specifically configured in accordance to the codebase of an application. The code profile may be converted to a runtime model of the code that can be used to instruct an agent on what aspects to instrument (monitor and/or regulate). Instrumenting the runtime agent may include analyzing the code profile and thereby identifying a subset of data flows related to sensitive data. The entire execution of an application may not be instrumented, and instead a select portion of application code may be instrumented to particularly monitor that portion of execution. Controls identified or otherwise selected for instrumentation may be selected based on graph based connections to data flows susceptible to data leaks.

Preferably through tagging the execution flow, input data (i.e. payloads) may be analyzed and tracked through the execution flow at runtime. Tagging the execution flow functions to introspect how method executions go through the set of controls. For example, the execution flow of a sales transaction between an HTTP request to a database output may be inspected to see if the execution flow used an execution flow path that was or was not logged.

In one exemplary implementation of instrumentation, atomic compare and swap operations are executed during each control checkpoint (e.g., method call) and used in setting a flow counter. The atomic compare and swap operation is preferably a single instruction that can be used in implementing the flow counter mechanism to track execution paths. The state of some counter can be compared and selectively updated based on its value. Incorporating flow counters may be used in execution flow. In one variation, the program code is recompiled (if necessary) to insert these instructions. In another variation, bytecode from the program code can be modified to insert these instructions. These variations or other suitable forms of instrumentation may allow flow tracking with low overhead. Multiple flows can be tracked simultaneously in an efficient manner by devoting an array of flow counters in memory.

Figure 9A:
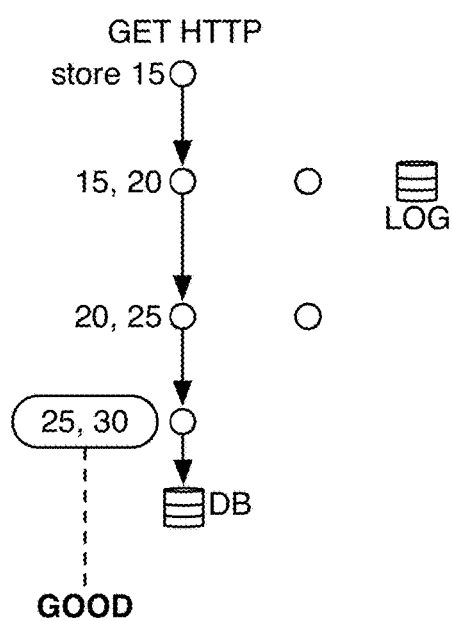
FIGS. 9A and 9B are schematic representations of a variation of instrumenting an application for monitoring during runtime.
Figure 9B:
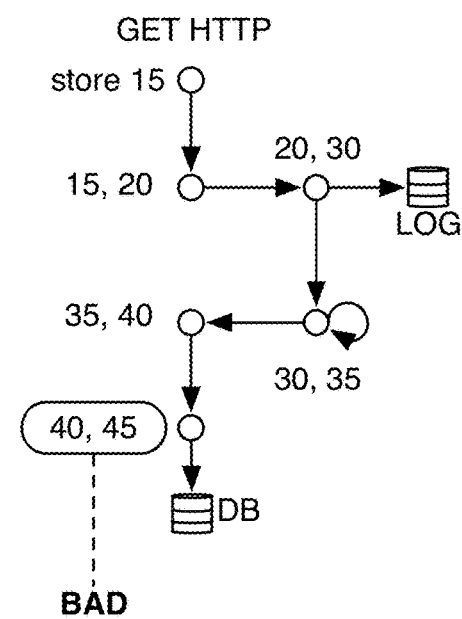

An execution flow of interested may be selected and instrumented such as shown in the exemplary execution flow of method calls. A flow counter may be compared and incremented based on the flow of execution control, which may result in a counter ending on different values depending on the particular path. As shown in FIGS. 9A and 9B, the counter comparison and selective incrementing can result in different flow counter values depending on the control flow path. The counter will undergo different counter increments depending on the path so that "good" and "bad" paths can be detected. In the case of a "bad" path (i.e., execution flow satisfying a sequence condition associated with a security event), a security event can be triggered and a corresponding response taken. This may be used to detect execution flows that may expose vulnerabilities such as logging sensitive data shown in FIG. 9B.

Monitoring sensitive data preferably leverages interpretation of expected execution of the application code through a code profile and more specifically a CPG. In understanding the design of the application code, more nuanced data leaks can be detected than approaches that lack an awareness of the underlying design of an application. As one exemplary instance of this, sensitive data can be tracked and monitored even across one or more transformations of the sensitive data. For example, sensitive data can be tracked through a data flow even after encryption. Such targeted detection may particularly utilize tracing of the execution flow. Execution flow may be manifested in tracking sequence of method calls. A particular sequence pattern of method calls may be a monitored condition predetermined prior to execution and used to detect a sensitive data related events. Such sequence patterns may include direct sequential method call patterns. Sequence patterns may additionally include patterns characterizing loops and iterations. Detecting an event may identify a security event by tracing through the execution flow and identifying where data is used. In one example, user data can be traced through the code profile and used to detect user data being used in MySQL output, identifying a potential data leak.

Block S122, which includes identifying and characterizing sensitive data through data usage, functions to determine and protect vulnerable data elements through application usage. Identifying and characterizing sensitive data through data usage S122 may thus identify and characterize data elements that may have not been previously identified as sensitive data. Alternatively, the characterizing of sensitive data as determined by application code processing may be reviewed, refined, or further enhanced by additional runtime monitoring. Identifying and characterizing sensitive data through data usage S122 may identify sensitive data in a similar manner as monitoring the code flow in the application. That is, monitoring of sensitive data flows, new data elements may be observed that interact with the sensitive data and additionally tagged as sensitive data. Additionally, methods of data utilization that may have not been determined prior to the application runtime, can lead to the method identifying and characterizing data elements as sensitive data. Additionally, other forms of targeted data leak prevention such as payload inspection may be used. In one preferred variation, targeted payload inspection can be performed on previously identified sensitive data (from application code). The targeted payload inspection can additionally be triggered from detecting an associated data flow event. The payload inspection can preferably be more efficiently performed by isolating payload inspection to a subset of runtime activity.

Block S124, which includes updating the characterization of the sensitive data through data usage, functions in updating the sensitive data score of sensitive data dependent on sensitive data utilization. Through monitoring flow of the sensitive data during application runtime S120, the sensitive data score of sensitive data may be updated by an assessment of how exposed the sensitive data is. Updating the characterization of the sensitive data S124 may implement any desired method to measure, assess, and update the vulnerability of the sensitive data. Generally speaking, sensitive data that is utilized more and/or is more exposed (e.g. is shared and exposed more to external elements, is logged in more locations, controlled by many elements, utilized for operations that are marked as high security) may have their sensitive data score increased, while sensitive data that are utilized less and for less important interactions, may have their sensitive data score decreased. Preferably, S124 will use the same method for characterizing the sensitive data that was used previously in characterizing a sensitive data.

Block S126, which includes enforcing security measures on the data, functions in implementing security measures and controls on the sensitive data during application runtime. Enforcing security measures on the data S126 may be accomplished by a runtime agent, but may alternatively be performed by some other means. Enforcing security measures on the data S126 preferably depends on the sensitive data characterization of the sensitive data. Security measures may include sending warning messages, collecting and sharing data metrics, blocking a data utilization, blocking a data flow, and enforcing a data interaction. Additional and/or alternative security measures may be implemented as desired.

Enforcing security measures on the data S126 is preferably dependent on the sensitive data characterization of the sensitive data. For example, a warning message may be sent any time a password sensitive data is utilized. In another example, where the sensitive data is a data object that contains personal bank information for an individual, enforcing security measures on the data S126 may block certain types of unsecure connections to transfer the bank information. Alternatively, enforcing security measures on the data S126 may force the bank information to be shared over one specific (potentially encrypted) connection.

In some variations, enforcing security measures on the data S126 may be dependent on a security parameter set by an administrator or by the system. Increasing or decreasing the security parameter may increase or decrease the level of enforcement. Alternatively, adjusting the security parameter may lead to a fixed action during enforcing security measures on the data S126. For example, during software development period, the security parameter may be set such that enforcing security measures only provides data feedback and possibly warning messages.

Additionally, enforcing security measures on the data S126 may depend on the sensitive data policy. The sensitive data policy may include information on how security measures should be enforced on the data. The sensitive data policy may include any level of abstraction or control over enforcing security measures as desired. Examples of different levels of control from the sensitive data policy may include: specific response to a sensitive data (e.g. prevent warnings on a login password), response to a sensitive data category (e.g. block external utilization of private personal information), general policies (e.g. communicate with external systems only over a secure network). Alternatively, in some variations the sensitive data policy may be limited on how much control it can impose on the enforcing security measures on the data S126; which may be the case for an unknown, purchased, sensitive data policy.

Block S130, which includes responding to vulnerabilities, functions in implementing a response to execution of the method. Responding to vulnerabilities S130 may implement an automated response, enable a user response, or a combination of both. In some cases, S130 may be a response initiated in coordination with or as part of S126. In some variations responding to vulnerabilities S130 is only implemented when sensitive data is exposed. Alternatively, responding to vulnerabilities S130 may always be called regardless of the status of the sensitive data. For example, responding to vulnerabilities S130 may include generating a security report.

Generating the security report may occur regardless of any sensitive data being at risk. For example, the security report may include the kind of data the application is handling and the application specific sensitive data, regardless of correct/incorrect handling of the data. This may serve to inform administrators or other interested parties of what type of data is being handled by an application and possibly where and how. The security report may include any type of desired potentially available information. Generating a security report may preferably be modified to show (or not show) other desired information.

Responding to vulnerabilities S130 may include automatically responding to vulnerabilities. Automatically responding to vulnerabilities functions to implement automated actions to monitor and protected exposed sensitive data. Automatically responding to vulnerabilities may include: generating an application metric, generating a security report, adding or modifying terms in a security code policy, and reporting changes in the application status. In one variation, generating a security report may be used to generate an audit of data handling. This may function to show compliance with various data handling measures and/or adherence to standards such as General Data Protection Regulation (GDPR) or other similar regulations. Additionally, actions may be added or removed from automatically responding to vulnerabilities S130 as necessary or desired.

Responding to vulnerabilities S130 may include automatically augmenting handling of sensitive data. For example, a runtime agent may be configured to implement supplemental sensitive data handling transformations or operations. Such supplemental handling may include obfuscating the data or obfuscating sections of the data. For example, if financial data like a credit card number was detected as being written to a log, enforcement could be automatically invoked by the method to obfuscate the credit card number before writing to the log. These handling operations may be additional processes to those specified in the application code. The handling operations may alternatively be changes to process in the application code. For example, encrypting sensitive data with one form of encryption process may be changed to a second encryption process for enhanced encryption. These changes may be made during runtime, but could additionally or alternatively be implemented within the application code prior to execution and/or deployment.

Responding to vulnerabilities S130 may include enabling a user to interact with the method; preferably through a user interface. Enabling a user to interact may allow an action and/or response prior to the application runtime and during the application runtime. Responding to vulnerabilities S130 may enable a user to modify actions in "real time", altering enforcing security measures on the data S126 (e.g. by changing the security parameter). In one exemplary implementation, a sensitive data alert message may be communicated to an administrator account (e.g., a developer of the application) while additionally alter the handling of the data object by issuing a security error within the application effectively preventing some output activity of the sensitive data object. The message can alert the administrator and possibly provide an interaction mechanism to further alter the handling of the data object. For example, the administrator may provide input to continue blocking output activity or input to ignore warnings. Other suitable interactions could similarly be implemented.

In one variation, the method may additionally include appending sensitive data metadata when communicating with other processes (e.g. in a microservice or a service oriented architecture environment). The sensitive data metadata preferably includes the sensitive data classification and/or score along with any suitable contextual information such as data flow information, data transformations and the like. Appending sensitive data metadata can be used so that multiple services can coordinate sensitive data management. For example, different microservices or applications may communicate sensitive data information so that management and handling of sensitive data can continue across and outside a single application. In this way some forms of sensitive data (e.g., low sensitivity data) can be communicated to a cooperating application with some level of assurance the application can support proper sensitive data management.

In one preferred implementation, sensitive data communicated over HTTP can have a sensitive data classification added to an HTTP header. The receiving application can ingest that sensitive data classification to continue sensitive data management in a cross-application continuous manner. Execution of an application may similarly receive and incorporate sensitive data metadata. The method may additionally include receiving communication of a data object accompanied by sensitive data metadata, and monitoring flow of the received data during application runtime in coordination with the sensitive data metadata. Accordingly, data received without such metadata or with metadata indicating not sensitive may not be monitored. Received data indicated to be sensitive can be monitored in similar manner to data objects identified as sensitive in the application code. Additionally, an outside application or service may signal support for such sensitive data management. For example, when establishing a network connection or a handshake process, an outside application may explicitly indicate it supports sensitive data management. The application can then alter management of sensitive data outbound to or inbound from such an application.

In some variations, the implemented protocol may not have a way of appending metadata, that is adding metadata without modifying the main payload (e.g. Kafka-based queueing system). In these variations, passing of sensitive data may be identified by uniquely identifying the resource that the application is communicating with (e.g. host, port, resource name), and correlating the passing of the sensitive data with utilization or consumption of the sensitive data by another process. A conclusion reached this way would be that the consumer process is thus consuming sensitive data through that resource (in general), and should therefore not leak anything that is received through that channel.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for monitoring and protecting sensitive data comprising:
    identifying sensitive data comprising:
        processing a semantic description of data in an application code, and
        characterizing the sensitive data;
    monitoring flow of the sensitive data during application runtime comprising:
        identifying and characterizing sensitive data through data usage,
        updating the characterization for the sensitive data through data usage, and
        enforcing security measures on the data according to the sensitive data characterization; and
    responding to vulnerabilities of the data, comprising responding according to the sensitive data characterization of the data.
2. The method of claim 1, further comprising generating an application specific code profile comprising a data flow graph wherein monitoring flow of the sensitive data is monitored in part with the code profile.
3. The method of claim 1, wherein identifying sensitive data further comprises searching a security code policy.
4. The method of claim 3, wherein processing the semantic description of data in the application code comprises comparing application code semantic data to language within the security code policy.
5. The method of claim 1, wherein identifying sensitive data comprises identifying the sensitive data within the application code.
6. The method of claim 1, wherein identifying sensitive data comprises identifying the sensitive data by determining and monitoring the flow of the sensitive data through the application code prior to application execution.
7. The method of claim 1, wherein processing the semantic description of data in the application code comprises determining the sensitive data from variable names.
8. The method of claim 1, wherein processing the semantic description of data in the application code comprises determining the sensitive data from documentation of the application code.
9. The method of claim 1, wherein characterizing sensitive data comprises determining a type of sensitive data.
10. The method of claim 9, wherein characterizing sensitive data comprises generating a sensitive data score for the sensitive data.
11. The method of claim 1, wherein monitoring flow of the sensitive data during application runtime further comprises monitoring the data interaction with external sources.
12. The method of claim 11, wherein monitoring flow of the data during application runtime further comprising monitoring flow of the data within external applications.
13. The method of claim 1, wherein identifying sensitive data comprises applying a machine learning classification model and thereby identifying at least one sensitive data in the application code.
14. The method of claim 1, wherein enforcing security measures on the data comprises preventing insecure usage of the sensitive data.

15. The method of claim 1, further comprising setting a security parameter and increasing or decreasing a level of security enforcement in accordance with the security parameter.

16. The method of claim 1, wherein responding to vulnerabilities of the data comprises generating a security report.

17. The method of claim 1, wherein responding to vulnerabilities of the data comprises sending warning messages.

18. The method of claim 17, wherein responding to vulnerabilities of the data further comprises updating the code dictionary.

19. A system for identifying and monitoring sensitive data comprising:
   sensitive data policy stored within a non-transitory computer medium, comprising of lists of words and phrases pertaining to sensitive data;
   a code semantics engine, wherein the code semantics engine is configured to identify sensitive data within an application code with aid of the sensitive data policy;
   a code profile, wherein the code profile is an application specific analysis of at least a subset of the application code, comprising: a code object graph that maps the application code in a functional manner;
   a runtime enforcement agent, wherein the runtime enforcement agent is configured to monitor sensitive data utilization during runtime, enforce security measures on the sensitive data, and report sensitive data utilization; and a
   user interface operable on a computing device that is configured to output through the user interface a report on at least the sensitive data utilization.

20. The system of claim 19, wherein the code property graph comprises:
   an asymmetric tree graph that characterizes the structure and syntax of the application code;
   a data flow of graph that characterizes the flow of data interactions of the application code; and
   a control flow graph that characterizes the functional executions of the application code.

* * * * *